US008056858B2

(12) United States Patent
Koehler et al.

(10) Patent No.: US 8,056,858 B2
(45) Date of Patent: Nov. 15, 2011

(54) DEVICE AND METHOD FOR PROVIDING RADIATION OCCLUSION AND AERO-THERMAL PROTECTION

(75) Inventors: Frederick Koehler, Tucson, AZ (US); Wing Cheng, Sunnyvale, CA (US); Helen H. Cheng, legal representative, Sunnyvale, CA (US)

(73) Assignee: Raytheon Company, Waltham, MA (US)

( * ) Notice: Subject to any disclaimer, the term of this patent is extended or adjusted under 35 U.S.C. 154(b) by 1297 days.

(21) Appl. No.: 11/679,324

(22) Filed: Feb. 27, 2007

(65) Prior Publication Data
US 2010/0270430 A1    Oct. 28, 2010

(51) Int. Cl.
G02B 23/16    (2006.01)
B64G 1/52    (2006.01)

(52) U.S. Cl. ............... 244/121; 244/171.7; 359/612

(58) Field of Classification Search .......... 244/171.7, 244/171.8, 121; 359/511, 611, 612
See application file for complete search history.

(56) References Cited

U.S. PATENT DOCUMENTS

| | | | | | |
|---|---|---|---|---|---|
| 2,508,398 | A | * | 5/1950 | Kelch, Jr. ................. | 280/644 |
| 3,047,259 | A | * | 7/1962 | Tatnall et al. ............. | 244/138 A |
| 3,118,636 | A | * | 1/1964 | Kantrowitz et al. ....... | 244/159.1 |
| 3,313,112 | A | * | 4/1967 | Reichert et al. ........... | 60/200.1 |
| 3,347,309 | A | * | 10/1967 | Webb ....................... | 165/86 |
| 3,432,125 | A | * | 3/1969 | Schroeder, Jr. ........... | 244/130 |
| 3,715,149 | A | * | 2/1973 | Freeland ................... | 359/611 |
| 4,045,117 | A | * | 8/1977 | Lerner ...................... | 359/612 |
| 4,295,706 | A | * | 10/1981 | Frost ........................ | 359/611 |
| 4,669,685 | A | * | 6/1987 | Dalby ...................... | 244/171.7 |
| 4,833,837 | A | * | 5/1989 | Bonneau .................. | 52/2.19 |
| 4,896,847 | A | * | 1/1990 | Gertsch .................... | 244/159.1 |
| 5,080,306 | A | * | 1/1992 | Porter et al. .............. | 244/171.7 |
| 5,108,047 | A | * | 4/1992 | Puech ...................... | 244/113 |
| 5,328,132 | A | * | 7/1994 | Shelby, Jr. ............... | 244/53 R |
| 5,623,367 | A | * | 4/1997 | Immel ...................... | 359/600 |
| 5,716,030 | A | * | 2/1998 | LaFiandra et al. ........ | 244/158.1 |
| 6,029,733 | A | * | 2/2000 | Xue ......................... | 160/84.07 |
| 6,065,252 | A | * | 5/2000 | Norsen .................... | 52/66 |
| 6,431,393 | B1 | * | 8/2002 | Stewart .................... | 220/826 |
| 6,542,698 | B2 | * | 4/2003 | Izawa ...................... | 396/287 |
| 7,104,658 | B2 | * | 9/2006 | Fischbach et al. ........ | 359/611 |
| 7,144,123 | B2 | * | 12/2006 | Lungren et al. .......... | 359/511 |
| 7,219,859 | B2 | * | 5/2007 | Johnson et al. ........... | 244/159.1 |
| 7,401,752 | B2 | * | 7/2008 | Lundgren et al. ......... | 244/171.7 |
| 7,464,900 | B2 | * | 12/2008 | Clark et al. ............... | 244/171.7 |
| 7,557,995 | B1 | * | 7/2009 | Lloyd ...................... | 359/642 |
| 7,837,154 | B2 | * | 11/2010 | Trabandt et al. .......... | 244/159.1 |
| 2010/0187364 | A1 | * | 7/2010 | Kutter et al. .............. | 244/171.7 |
| 2010/0187365 | A1 | * | 7/2010 | Kutter et al. .............. | 244/171.7 |

* cited by examiner

*Primary Examiner* — Tien Dinh
*Assistant Examiner* — Joseph W Sanderson
(74) *Attorney, Agent, or Firm* — SoCal IP Law Group LLP; John E. Gunther; Steven C. Sereboff

(57) ABSTRACT

An extendable device for providing radiation occlusion and/or aero-thermal protection is disclosed. In various representative aspects, the present invention generally includes an extendable collar and a flexure configured to provide elastic properties (e.g., to facilitate stowage and/or deployment with respect to conformational disposition of the flexure). The flexure is coupled to a collar and is also coupled to the housing of an optical device.

14 Claims, 7 Drawing Sheets

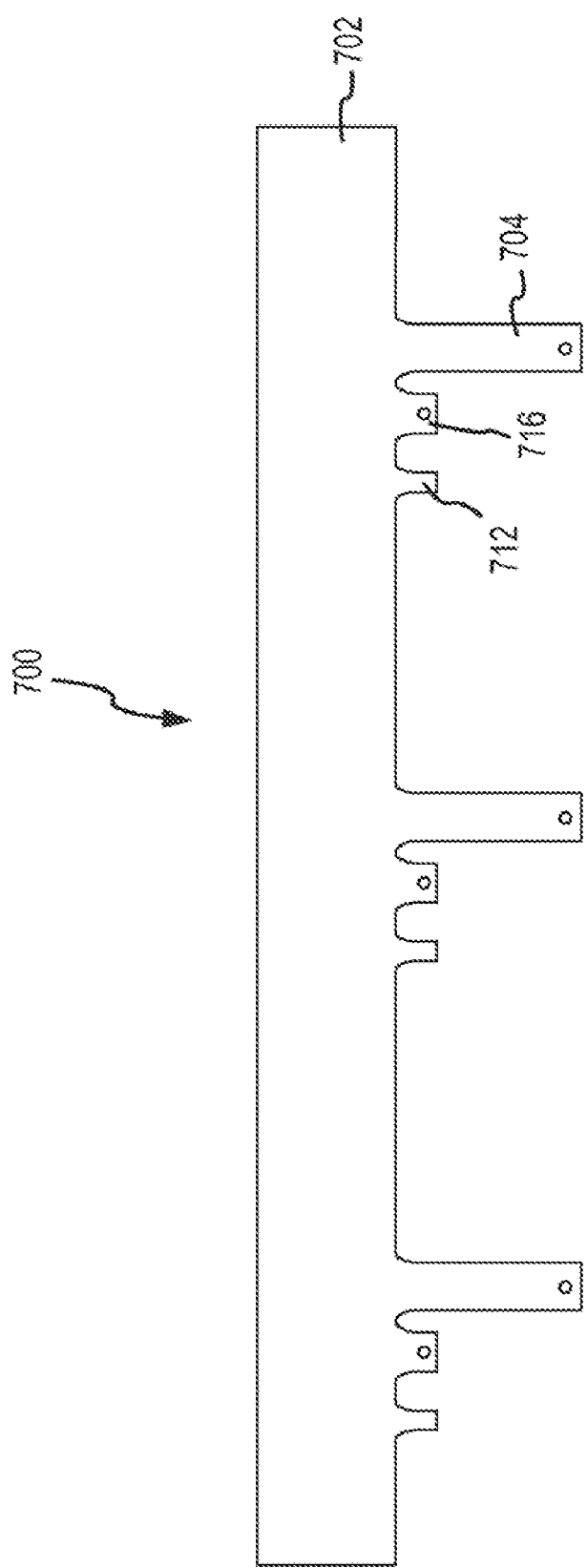

DEVICE AND METHOD FOR PROVIDING RADIATION OCCLUSION AND AERO-THERMAL PROTECTION

The United States Government may have rights in this invention as provided under contract N00024-03-C-6111 awarded by the Department of the Navy.

FIELD OF INVENTION

The present invention generally concerns devices and methods for providing, radiation shielding and aero-thermal protection; and more particularly, representative and exemplary embodiments of the present invention generally relate to extendable devices for selectively deploying radiation occlusion and/or aero-thermal heat protection systems for use with optical systems.

BACKGROUND OF THE INVENTION

In a variety of applications and operating environments, it may be desirable to provide protection against incident radiation and/or aero-thermal heating. In the field of optics, with respect to ambient radiation, an optical device with a given field of view may be capable of detecting radiation from a variety of sources. In certain cases, some radiation sources may obstruct detection of other radiation sources. This obstruction may reduce the utility of specific optical systems with regard to analysis of particular radiation sources. For these systems, it may be desirable to shield the system for radiation in order to improve the utility of the optical device.

With respect to aero-thermal protection, some optical devices may be configured for use in conditions likely to produce aero-thermal heating, as in the case of aerial projectiles. If this heating is transferred to an optical device, it may impair use of the device. In such situations, it may be desirable to shield the system from aero-thermal heating in order to improve the utility of the optical device.

In certain practical applications, some projectile systems may be configured to jettison a nose cone at a particular stage in their operation. Prior to being jettisoned, the nose cone may substantially constrain the geometry of an occlusive and/or aero-thermal protecting collar. When the nose cone is jettisoned, such constraints are generally irrelevant.

Various conventional systems have been proposed to provide radiation occlusion and/or aero-thermal protection. A representative system uses expandable welded bellows coupled to the optical system. When extended, the bellows take the shape of a substantially cylindrical, substantially hollow collar surrounding the optical device and having a principal axis substantially coincident with that of the optical device. The expanded bellows may be configured to prevent obstructive radiation from interfering with radiation sources inside the field of view of the optical system. The expanded bellows may also be configured to provide the optical device with aero-thermal protection. When a bellows system is configured for one or both of these features, the utility of the optical system is generally increased; however, problems with the bellows system include a high number of moving parts (along with attendant heightened probability of failure), a relatively high mass, a corresponding complexity of the translation calculation when employed in a projectile, a relatively low stiffness, and a tendency to deform.

Accordingly, there is a need for an extendable protective device that may be used to provide radiation occlusion and/or shielding against aero-thermal heating that is both lightweight and mechanically simplified. Additionally, there is a need for an extendable protective device that provides a low probability of failure and that addresses other deficiencies associated with the conventional art.

SUMMARY OF THE INVENTION

In various representative aspects, the present invention comprises extendable radiation occlusion and/or aero-thermal protection devices and methods. Exemplary features generally include a collar and a flexure configured to operate within an elastic region. The flexure is generally coupled to the collar and the housing of an optical device. The collar may be adapted for stowage in response to compression of the flexure and deployment in response to extension of the flexure. Various representative embodiments may include multiple collars, multiple flexures, a tab and groove system locking an extended collar, and the like. Exemplary methods for fabricating such systems are also disclosed.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in hat of certain exemplary embodiments recited in the detailed description, wherein:

FIG. 7 representatively illustrates a proto-collar in accordance with an exemplary embodiment of the present invention.

Figure 1:
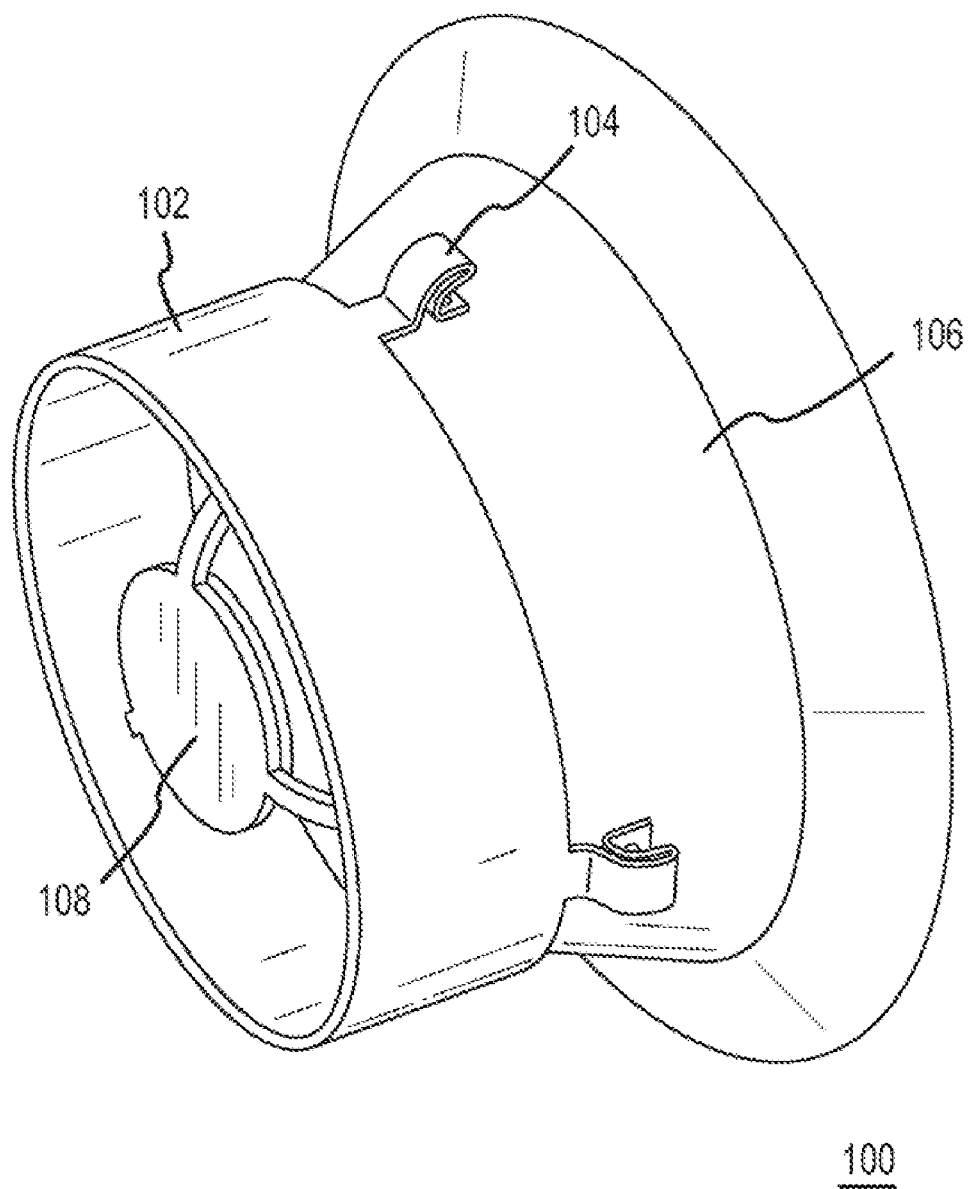
FIG. 1 representatively illustrates a stowed extendable device in accordance with an exemplary embodiment of the present invention.

Elements in the figures are illustrated for simplicity and clarity and have not necessarily been drawn to scale. For example, the dimensions of some of the elements in the figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system that may be suitably adapted to employ extendable collars. A detailed description of an exemplary application, namely an extendable collar configured to provide shielding from radiation and/or aero-thermal protection of an optical device, is provided as a specific enabling disclosure that may be generalized to any application of the disclosed device and method in accordance with various embodiments of the present invention.

In various representative embodiments in accordance with the present invention, an extendable collar system may include multiple collars, multiple flexures, tabs, grooves, coupling to a housing, configuration for operation with an optical device, configuration for radiation occlusion, configuration for aero-thermal protection, and the like. For example, a single collar and flexure may be configured to deploy so as to occlude a specified locus of incident radiation and/or provide aero-thermal protection. As another example, a single collar may be coupled to multiple flexures and further configured to deploy so as to occlude a specified locus of incident radiation and/or provide aero-thermal protection. As yet another example, multiple collars may be coupled to multiple flexures and suitably configured to independently deploy so as to occlude a specified locus of incident radiation and/or provide aero-thermal protection.

FIG. 1 representatively illustrates a stowed extendable device 100 in accordance with an embodiment of the present invention. As generally depicted in FIG. 1, extendable device 100 includes a collar 102 coupled to a flexure 104. The flexure 104 may be coupled to a housing 106, and the housing 106 further coupled to an optical device 108. Collar 102 may be stowed in response to compression of the flexure 104.

Extendable device 100 may be, for example, integrated, into a missile, which may further comprise a payload, propulsion system, guidance system, and/or the like. Optical device 108 may comprise a component of a sensor system tasked with providing information to the guidance system to identify and/or predict the position of a target relative to the missile. The guidance system may receive information from optical device 108 and process the information to control the flight path of the missile and intercept a target. Alternatively, conjunctively or sequentially, extendable device 100 may be used in other applications and environments for sensing information, such as astronomy instruments, cameras, measuring instruments, and/or the like.

Housing 106 may comprise any features or elements that may be suitably configured to support and/or protect optical device 108. For example, housing 106 may comprise the exterior of a missile, the exterior of a satellite, the exterior of binoculars, the casing of a telescope, the casing of a sensor, the casing of a space-based optical device, and/or the like. In various representative and exemplary embodiments, housing 106 may be suitably configured such that housing 106 is substantially distinct from optical device 108, and/or optical device 108 is substantially supported and/or protected by housing 106. Housing 106 may be suitably configured as a subsystem of collar/flexure 102/104, where coupling with housing 106 substantially defines the position of collar/flexure 102/104.

Housing 106 may be coupled to flexure 104 in various ways. For example, flexure 104 and housing 106 may comprise substantially distinct regions of a unitary article of manufacture. Alternatively, flexure 104 and housing 106 may comprise multiple pieces coupled together. Additionally, more than one flexure 104 may be coupled to more than one piece of housing 106. For example, as shown in FIG. 1, plural flexures 104 may be distributed about a circumference of the collar 102. As a further example, housing 106 may be coupled with flexure 104 to provide an air dam as between the collar 102 and housing 106.

Optical device 108 may include any element or feature that may be suitably configured to manipulate incident radiation, such as, for example: a lens, a mirror, a photosensitive membrane, a laser, and/or the like. Optical device 108 may be coupled to housing 106 in accordance with various representative mechanisms. For example, optical device 108 and housing 106 may comprise distinct regions of a substantially unitary article of manufacture. Alternatively, optical device 108 and housing 106 may comprise two (or more) pieces coupled together. As a further example, more than one optical device 108 may be coupled to a single housing 106.

Collar 102 may comprise any elements or features that may be suitably configured to protect a subsystem distinct from collar 102. In an exemplary and representative embodiment, collar 102 may be configured to substantially occlude radiation and/or provide aero-thermal protection. For example, collar 102 may be cylindrically-shaped and/or suitably disposed such that the principal axis of the cylinder is substantially coextensive with that of optical device 108. In another example, collar 102 may comprise a substantially conic-shape suitably disposed such that the principal axis of the conic-shape is substantially coextensive with that of optical device 108. In yet a further exemplary embodiment, collar 102 may comprise a device having a principal axis substantially angled to that of a suitably coupled optical device 108.

Flexure 104 may include any features or elements that may be suitably configured to operate in an elastic region coupled to at least one collar so as to compress in response to stowage of the collar and deploy the collar in response to extension. The elastic region may comprise a region of deformation where the deformation of a material is substantially reversed in response to reversal of the deformation condition; such as, for example, the return of a flexure to its pre-compression configuration following extension, the return of a flexure to its pre-tensioning configuration following de-tensioning, and the like. Generally included in this description are the properties of shape memory alloys, regardless of whether such alloys are activated by additional inputs such as the presence of a potential difference, absence of a potential difference, heating, cooling, presence of radiation, absence of radiation, presence of a magnetic field, absence of a magnetic field, combinations thereof, and/or the like.

As representatively illustrated in FIG. 1, collar 102 may be disposed in a substantially stowed position. Stowage is generally intended to include any position of collar 102 where coupled flexure 104 may be transitioned from an extended state to a compressed state. When stowed, collar 102 may be substantially inoperative for at least one of radiation occlusion and aero-thermal protection with respect to optical device 108.

Figure 2:
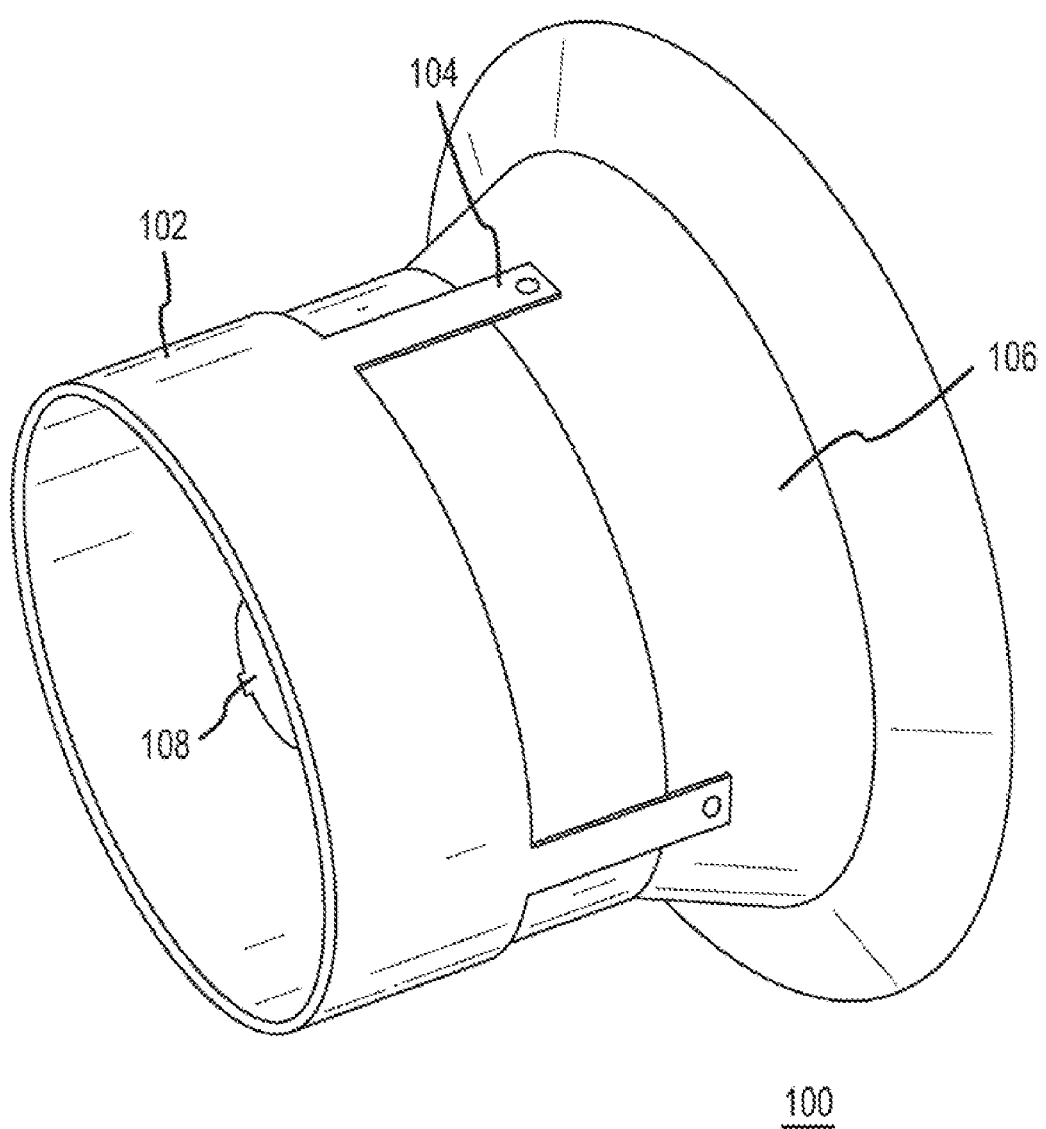
FIG. 2 representatively illustrates a deployed extendable device in accordance with the exemplary embodiment generally depicted in FIG. 2.

FIG. 2 representatively illustrates a deployed extendable device 100 in accordance with an embodiment of the present invention. In the exemplary embodiment depicted therein, collar 102 may deployed in response to extension of flexure 104. Comparison of FIG. 2 with FIG. 1 shows that the extension of flexure 104 caused collar 102 to translate in a direction parallel to an axis of collar 102 from a stowed position to a deployed position. Extendable device 100 may be extended to the extent that extendable device 100 suitably changes position in response to release of a load, such as, for example, collar 102 coupled to flexure 104. Collar 102 may be suitably configured to deploy and stow with respect to optical device 108 in response to extension and compression of flexure 104.

The term "deployment" (including any contextual variant thereof) is generally intended to describe any position of collar 102 where coupled flexure 104 transitions from a compressed state to an extended state. When deployed, collar 102 may be configured to be substantially operative for at least one of radiation occlusion and aero-thermal protection of optical device 108. Radiation occlusion is generally intended to describe a configuration of any material that provides for interfering with incident radiation such that at least some of the incident radiation is substantially impeded by the material by, for example: reflection; absorption; refraction; and/or the like. Radiation may include the emission and/or propagation of energy in the form of particles and/or waves, such as, for example radiation from radiative heat transfer, radioactive decay, the electromagnetic spectrum, and/or the like.

The term "aero-thermal heating" (including any contextual variant thereof) is generally intended to describe any phenomenon of heating where inter alia friction as between the surface of a projectile and a fluid causes an increase in temperature along the interface between the projectile and the fluid. Collar 102 may be suitably adapted to offer protection to optical device 108 from heat transfer (as a result of incident radiation, and/or the like).

Collar 102 may comprise various materials, including for example: an alloy comprised of aluminum; an alloy comprised of cadmium; an alloy comprised of cobalt; an alloy comprised of copper; an alloy comprised of gallium; an alloy comprised of gold; an alloy comprised of indium; an alloy comprised of iron; an alloy comprised of manganese; an alloy comprised of nickel; an alloy comprised of platinum; an alloy comprised of silicon; an alloy comprised of silver; an alloy comprised of tin; an alloy comprised of titanium; an alloy comprised of zinc; aluminum; cadmium; carbon; cellulose; ceramic; cobalt; composite; copper; gallium; gold; indium; iron; manganese; nickel; platinum; polymer; silicon; silver; tin; titanium; zinc; and/or combinations thereof, and the like. Collar 102 may comprise a single piece of suitably configured material, or collar 102 may alternatively, conjunctively or sequentially comprise a plurality of pieces of suitably configured material(s).

Collar 102 may be suitably configured to comprise various geometries in a variety of representative embodiments. For example, collar 102 may comprise any of the following shapes and/or geometries: conic and/or conic section (for example: a circle, a cone, a cylinder, a hyperbola, a parabola, a sphere, and/or the like); cylindrical; decagonal; nonagonal; octagonal; heptagonal; hexagonal; pentagonal; rectangular; rhomboidal; triangular; spherical; and/or combinations thereof, and the like. Collar 102 may comprise a substantially continuous geometry or a substantially discontinuous geometry. Collar 102 may comprise a substantially continuous geometry with respect to one region of collar 102 and comprise a substantially discontinuous geometry with respect to another region of collar 102. Alternatively, conjunctively or sequentially, collar 102 may be suitably configured for operation with various other uniform, non-uniform, or random geometries.

Collar 102 may be suitably configured to comprise various sizes, shapes and dimensions in various representative embodiments. For example, if collar 102 is to be used in an application requiring low weight, collar 102 may be configured for minimization of material volume, as by reducing thickness during fabrication and assembly. As another example, if collar 102 is to be used in an application requiring durability, collar 102 may be configured to minimize the probability of mechanical failure, as by increasing thickness during fabrication and assembly. As yet another example, if collar 102 is to be used with a large optical device 108, collar 102 may he configured to occlude incident radiation and/or protect against aero-thermal heating over a relatively large locus.

Collar 102 may be suitably configured to comprise a variety of exemplary occlusive properties in various representative embodiments, including for example: occlusion according to a specified wavelength; occlusion according to a specified radiation source; occlusion according to multiple wavelengths; selective occlusion according to local electromagnetic conditions; selective occlusion according to a signal by a user; and/or combinations thereof, and the like. Representative occlusive properties may be imparted to collar 102 by a variety of methods, including: addition of occlusive aerial; coarsening; constructing collar 102 from suitably occlusive material; constructing collar 102 to comprise dimensions capable of exploiting the properties of an occlusive material; heat treatment; removing material; polishing; and/or combinations thereof, and the like.

Collar 102 may be suitably configured to comprise a variety of representative aero-thermal protective properties various representative embodiments, including for example: substantially low conductivity uniformly distributed throughout the material; substantially low conductivity in a specified region; substantially low friction incident to high-velocity fluids; substantially high emissivity in response to high temperature in a specified region; substantially low emissivity in response to high temperature in a specified region; and/or combinations thereof, and the like. Representative aero-thermal protective properties may be imparted to collar 102 by a variety of methods including: addition of aero-thermal protective material; coarsening; constructing collar 102 from suitably aero-thermal protective material; constructing collar 102 to comprise dimensions capable of exploiting the aero-thermal protective properties of a specified material; heat treatment; removing material; polishing; and/or combinations thereof, and the like.

Flexure 104 may comprise a variety of exemplary materials in various representative embodiments, including: an alloy comprised of aluminum; an alloy comprised of cadmium; an alloy comprised of cobalt; an alloy comprised of copper; an alloy comprised of gallium; an alloy comprised of gold; an alloy comprised of indium; an alloy comprised of iron; an alloy comprised of manganese; an alloy comprised of nickel; an alloy comprised of platinum; an alloy comprised of silicon; an alloy comprised of silver; an alloy comprised of tin; an alloy comprised, of titanium; an alloy comprised of zinc; aluminum; cadmium; carbon; cellulose; ceramic; cobalt; composite; copper; gallium; gold; indium; iron; manganese; nickel; platinum; polymer; silicon; silver; tin; titanium; zinc; combinations thereof; and the like. For example, flexure 104 may comprise shape memory alloys such as, for example: Ag—Cd; Au—Cd; Cu—Al—Ni; Cu—Sn; Cu—Zn; Cu—Zn—X (X=Si, Sn, Al); In—Ti; Ni—Al; Ni—Ti; Fe—Pt; Mn—Cu; Fe—Mn—Si; Pt alloys; Co—Ni-AL; Co—Ni—Ga; and/or combinations thereof, and the like. Flexure 104 may comprise a single piece of suitably configured material. Flexure 104 may alternatively, conjunctively or sequentially comprise a plurality of pieces of suitably configured material(s).

Flexure 104 may comprise, a variety of geometries, shapes and/or dimensions in various representative embodiments. For example, flexure 104 may be configured to impart a substantially constant force on coupled collar 102 throughout extension of flexure 104. As another example, flexure 104 may be configured to impart a substantially constant force on coupled collar 102 throughout compression of flexure 104. As yet a further example, flexure 104 may be configured to provide a variable force on coupled collar 102 during compression and/or extension of flexure 104.

Flexure 104 may he configured to deform in response to compression in various representative embodiments. For example, flexure 104 may be configured to buckle in a specified manner without necessarily plastically deforming. As a further example, flexure 104 may he configured to decrease in length along the direction of compression in substantial accordance to Poisson's ratio without necessarily plastically deforming. As yet a further example, flexure 104 ma be configured to both buckle and decrease in length along the direction of compression in substantial accordance with Poisson's ratio without necessarily plastically deforming. Additionally, flexure 104 may be configured to twist without necessarily plastically deforming. Flexure 104 may be alternatively, conjunctively or sequentially configured to demonstrate shape memory properties.

The term "compression" (including any contextual variant thereof) is generally intended to describe a resultant force on a body in an inward direction with respect to the distribution of mass of the body. Compression may result in deformation substantially in accordance with Poisson's ratio and/or deformation substantially similar to furling, buckling, twisting, bending, and/or combinations thereof, and the like.

The term "deforming" (including any contextual variant thereof) is generally intended to describe the process of modifying the shape of an object such that the post-modification shape is changed in a materially quantifiable way, such as, for example: bending; buckling; compressing; cooling; cutting; shape changes due to heating; shape changes due to melting; tensioning; torquing; and/or combinations thereof, and the like.

Collar 102 may be coupled with flexure 104 in various representative embodiments. For example, collar 102 and flexure 104 may comprise substantially distinct regions of a unitary article of manufacture. As a further example, collar 102 and flexure 104 may be coupled together from two separate component pieces or parts. As yet a further example, collar 102 may be coupled to more than one flexure 104, where each flexure 104 may be substantially similar with respect to each other in terms of, for example, response to compression. Additionally, collar 102 may be coupled to more than one flexure 104, where each flexure 104 may be substantially dissimilar with respect to each other in terms of response to compression. Collar 102 may also be coupled to flexure 104 such that coupled collar 102 and flexure 104 are suitably configured to demonstrate elastic properties.

Figure 3:
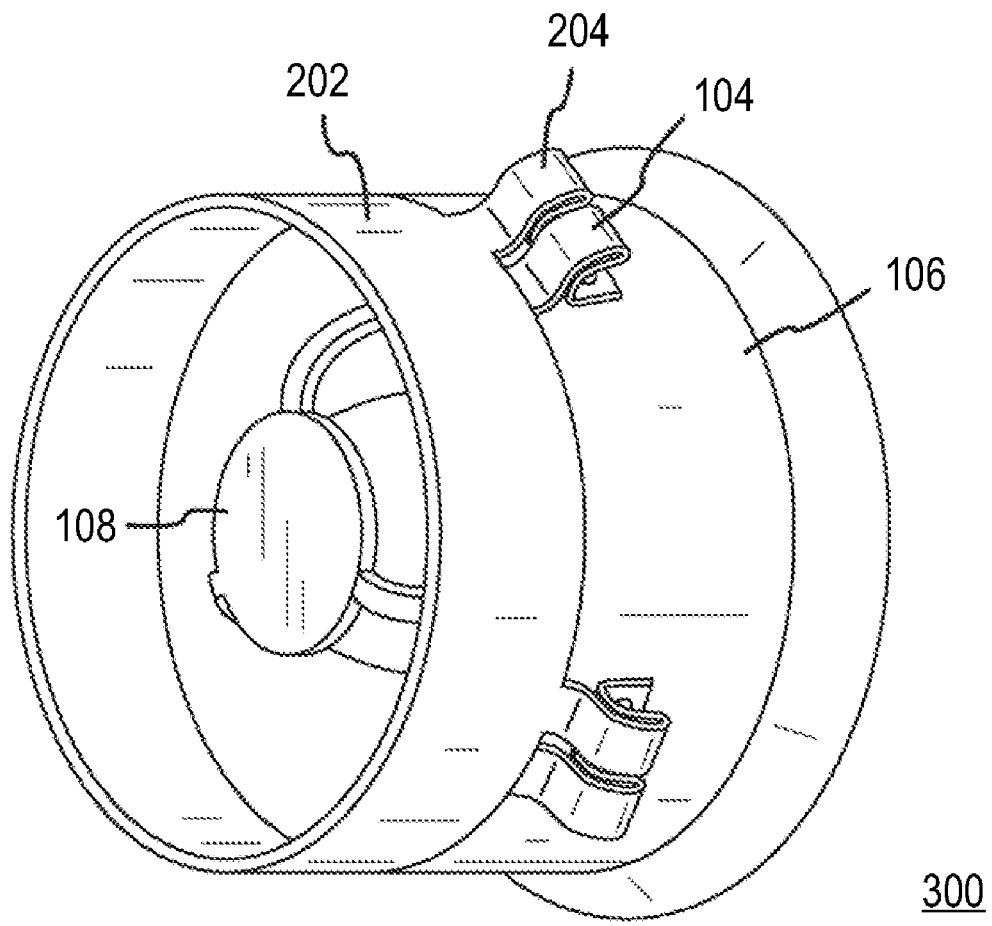
FIG. 3 representatively illustrates a stowed extendable device in accordance with another exemplary embodiment of the present invention.

FIG. 3 representatively illustrates a stowed extendable device 300 in accordance with a representative embodiment of the present invention. Extendable device 300 generally provides a second collar 202 coupled to a second flexure 204, where the second flexure 204 is further coupled to a housing 106, and the housing 106 is further coupled to an optical device 108. First collar 102 may be substantially obscured by the stowed second collar 202 and the second collar 202 may be stowed in response to compression of the second flexure 204. Additionally, first collar 102 may be stowed in response to compression of the first flexure 104.

Figure 4:
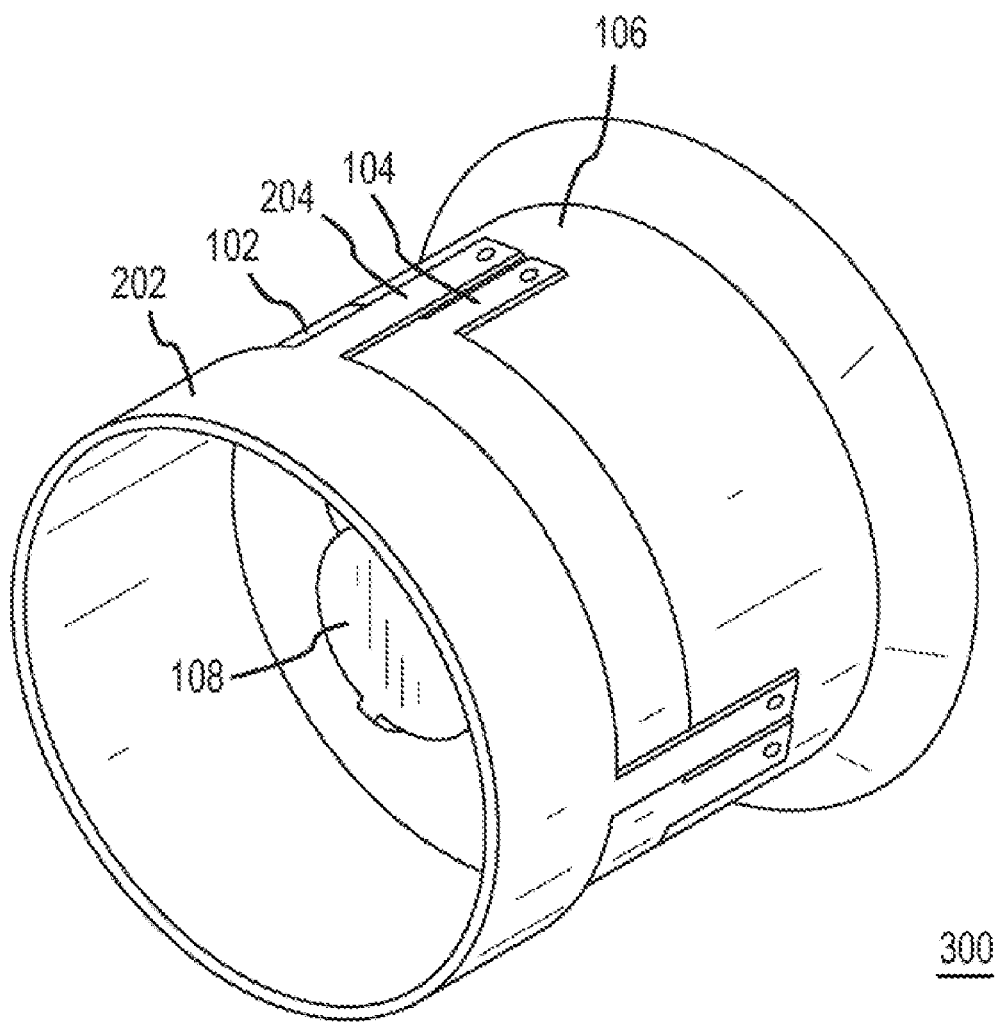
FIG. 4 representatively illustrates a deployed extendable device in accordance with e exemplary embodiment generally depicted in FIG. 3.

FIG. 4 representatively illustrates a deployed extendable device 300 in accordance with another embodiment of the present invention. In this embodiment, first and second collars 102/202 are deployed in response to extension of first and second flexures 104/204, respectively. Second collar 202 may be configured in a variety of ways with respect to first collar 102. For example, second collar 202 may be suitably configured to stow substantially encompassing (and/or substantially concentric with) the principal axis of first collar 102. As a further example, second collar 202 may be suitably configured to deploy substantially concentric with the principal axis of first collar 102, such that first collar 102 and second collar 202 are substantially non-coextensive.

The term "non-coextensive" (including any contextual variant thereof) is generally intended to describe the relative positions of multiple collars where there is substantially no overlap with respect to surfaces as between multiple extended collars, such as, for example: suitably configuring multiple collars to substantially independently occlude incident radiation when deployed, and/or the like.

As yet a further example, second collar 202 may be suitably configured to deploy substantially concentric with the principal axis of first collar 102, such that first collar 102 and second collar 202 are at least partially coextensive. Additionally, second collar 202 may be suitably configured to deploy substantially independently of deployment of first collar 102. Alternatively, second collar 202 may be suitably configured to deploy substantially in accordance with deployment of first: collar 102. While this representative embodiment illustrates a system comprising two collars 102/202, systems comprising more than two collars 102/202 may be suitably configured in accordance with various other exemplary embodiments in accordance with the present invention.

First collar 102 and second collar 202 may be suitably configured in accordance with various representative embodiments. For example, collars 102/202 may be suitably configured to demonstrate substantially similar occlusive properties. As a further example, collars 102/202 may be suitably configured to demonstrate substantially dissimilar occlusive properties. As yet a further example, collars 102/202 may be suitably configured for substantially similar or dissimilar aero-thermal protective properties. Additionally, collars 102/202 may be suitably configured for substantially synergistic aero-thermal protective operation. Moreover, collars 102/202 and housing 106 may be suitably configured for substantially synergistic aero-thermal protective operation. Alternatively, conjunctively or sequentially, first collar 102, second collar 202, first flexure 104, second flexure 204, and/or housing 106 may be suitably configured for substantially synergistic aero-thermal protective operation.

Collars 102/202 may be constructed as a substantially unitary article of manufacture. Alternatively, collars 102/202 may be constructed from multiple pieces or parts. Collars 102/202 may be constructed from substantially similar or dissimilar materials. More than one collar 102 may be suitably configured for coupling to housing 106 by way of more than one flexure 104, such that deployed collars 102 provide substantially circumferential radiation occlusion and/or aerothermal protection.

First flexure 104 and second flexure 204 may be suitably configured in a variety of ways. For example, flexures 104/204 may be suitably configured for substantially similar responses to compressive force(s). As another example, flexures 104/204 may be suitably configured for substantially dissimilar responses to compressive force(s). As a further example, flexures 104/204 may be constructed from as a substantially unitary article of manufacture. As yet a further example, flexures 104/204 may he constructed from multiple pieces or parts. Additionally, flexures 104/204 may be constructed from substantially similar or dissimilar materials.

Second flexure 204 may be suitably configured in a variety of ways. For example, second flexure 204 may be configured to couple to housing 106. Additionally, second flexure 204 may be suitably configured to couple to a first collar 102. As another example, second flexure 204 and second collar 202 may comprise distinct regions of a substantially unitary article of manufacture. As a further example, second flexure 204 and second collar 202 may comprise more than one piece or part. As yet a further example, second flexure 204 and first collar 102 may comprise a substantially unitary article of manufacture. Second flexure 204, second collar 202, first flexure 104, and first collar 102 may comprise substantially distinct regions of a substantially unitary article of manufacture. Additionally, flexures 104/204, collars 102/104, and housing 106 may comprise substantially distinct regions of a substantially unitary article of manufacture.

Figure 5:
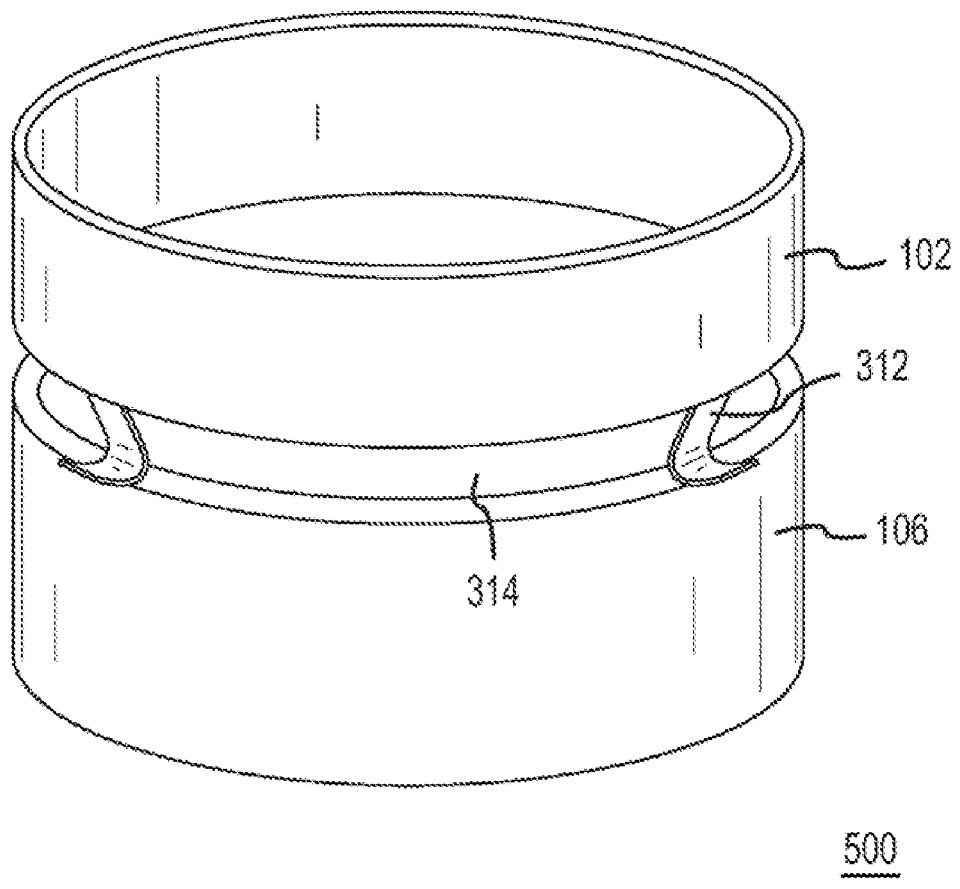
FIG. 5 representatively illustrates an extendable device including a tab in accordance with an exemplary embodiment of the present invention.

FIG. 5 representatively illustrates an extendable device 702 including a tab 312 in accordance with a representative embodiment of the present: invention. Extendable device 702 provides a collar 102 coupled to a flexure 104, the flexure 104 further coupled to a housing 106, the housing 106 further coupled to an optical device 108 (not shown). In this representative embodiment, collar 102 further comprises a tab 312 and housing 106 further comprises a groove 314, where tab 312 is suitably configured for operation with groove 314.

The term "tab" (including any contextual variant thereof) is generally intended to describe an appendage suitably configured for locking and/or unlocking with respect to a groove 314, such as, for example: a circumferential discontinuity; an indentation; a jut of material; a notch; and/or the like.

Tab 312 may be suitably configured to comprise a variety of materials in various representative embodiments, including for example: an alloy comprised of aluminum; an alloy comprised of cadmium; an alloy comprised of cobalt; an alloy comprised of copper; an alloy comprised of gallium; an alloy comprised of gold; an alloy comprised of indium; an alloy comprised of iron; an alloy comprised of manganese; an alloy comprised of nickel; an alloy comprised of platinum; an alloy comprised of silicon; an alloy comprised of silver; an alloy comprised of tin; an alloy comprised of titanium; an alloy comprised of zinc; aluminum; cadmium; carbon; cellulose; ceramic; cobalt; composite; copper; gallium; gold; indium; iron; manganese; nickel; platinum; polymer; silicon; silver; tin; titanium; zinc; and/or combinations thereof, and the like. Tab 312 may be suitably configured to comprise a substantially unitary article of manufacture. Alternatively, tab 312 may be suitably configured to comprise more than one piece or part.

Tab 312 may be suitably configured to comprise a. variety of geometries and/or shapes in various representative embodiments, including for example: conic and/or conic section (for example: a circle, a cone, a cylinder, a hyperbola, a parabola, a sphere, and/or the like); cylindrical; decagonal; nonagonal; octagonal; heptagonal; hexagonal; pentagonal; rectangular; rhomboidal; triangular; spherical; and/or combinations thereof, and the like. Tab 312 may comprise, a substantially continuous or discontinuous geometry. Tab 312 may comprise a substantially continuous geometry with respect to one region of tab 312 and comprise a substantially discontinuous geometry with respect to another region of the 312. Tab 312 may be suitably configured for operation with a variety of device geometries.

Tab 312 may be suitably configured in a variety of ways in accordance with representative embodiments of the present invention. For example, tab 312 may be suitably configured for operation with a collar 102 having a specified dimension. As another example, tab 312 may be suitably configured for operation with a groove 314 having a specified dimension. As yet a further example, tab 312 may be suitably configured to minimize the weight of tab 312. Tab 312 may also be suitably configured to maximize the durability of tab 312.

Tab 312 may be suitably configured in accordance with various representative embodiments with respect to the coupling between tab 312 and collar 102. For example, tab 312 may comprise a distinct region of collar 102, or tab 312 and collar 102 may comprise at least two coupled pieces or parts. As a further example, housing 106 may comprise a tab 312 suitably configured for operation with a collar 102 further comprising a groove 314, In a representative and exemplary embodiment, housing 106 may define groove 314. In another embodiment, collar 102 may define groove 314. Groove 314 may be suitably configured to comprise a variety of materials in various exemplary embodiments, including: an alloy comprised of aluminum; an alloy comprised of cadmium; an alloy comprised of cobalt; an alloy comprised of copper; an alloy comprised of gallium; an alloy comprised of gold; an alloy comprised of indium; an alloy comprised of iron; an alloy comprised of manganese; an alloy comprised of nickel; an alloy comprised of platinum; an alloy comprised of silicon; an alloy comprised of silver; an alloy comprised of tin; an alloy comprised of titanium; an alloy comprised of zinc; aluminum; cadmium; carbon; cellulose; ceramic; cobalt; composite; copper; gallium; gold; indium; iron; manganese; nickel; platinum; polymer; silicon; silver; tin; titanium; zinc; and/or combinations thereof, and the like. Groove 314 may be suitably configured to comprise a substantially unitary article of manufacture. Alternatively, groove 314 may be suitably configured to comprise more than one piece or part.

Groove 314 may be suitably configured to comprise various cross-sectional geometries in various representative embodiments, including for example: conic and/or conic section (for example: a circle, a cone, a cylinder, a hyperbola, a parabola, a sphere, and/or the like); cylindrical; decagonal; nonagonal; octagonal; heptagonal; hexagonal; pentagonal; rectangular; rhomboidal; triangular; spherical; and/or combinations thereof, and the like. Groove 314 may comprise a substantially continuous or discontinuous cross-sectional geometry. Groove 314 may comprise a substantially continuous cross-sectional geometry with respect to one region of the groove 314 and comprise a substantially discontinuous cross-sectional geometry with respect to another region of groove

314. Groove 314 may be suitably configured for operation with any cross-sectional geometry, whether now known or otherwise hereafter described in the art.

Groove 314 may be suitably configured in various representative embodiments with respect to other subsystems. For example, groove 114 and housing 106 may comprise substantially distinct regions of a substantially unitary article of manufacture. As a further example, groove 314 and housing 106 may comprise at least two coupled pieces or parts. As yet a further example, groove 314, housing 106 and flexure 104 may comprise substantially distinct regions of a substantially unitary article of manufacture. Alternatively, groove 314, housing 106, flexure 104 and collar 102 may comprise substantially distinct regions of a single piece or part. Additionally, groove 314, housing 106, flexure 104, collar 102 and tab 312 may comprise substantially distinct regions of a single piece or part.

Tab 312 may be configured for operation with groove 314 in a variety of ways in accordance with representative embodiments of the present invention. For example, tab 312 may be suitably configured for substantially compliant properties such that tab 312 may be adapted to be selectively substantially immobilized by groove 314, where groove 314 is suitably configured to selectively substantially immobilize tab 312.

As a further example, tab 312 may be suitably configured for substantially compliant properties such that a tab 312 may be adapted to selectively slick out of a groove 314. As yet a further example, tab 312 may be suitably configured to affect translation of a suitably coupled collar 102 such that the interface between tab 312 and groove 314 substantially affects translation of collar 102 (e.g., as by imparting a twist or a discontinuity in the groove 3.14 restricting reverse translation along the discontinuity, etc.).

Figure 6:
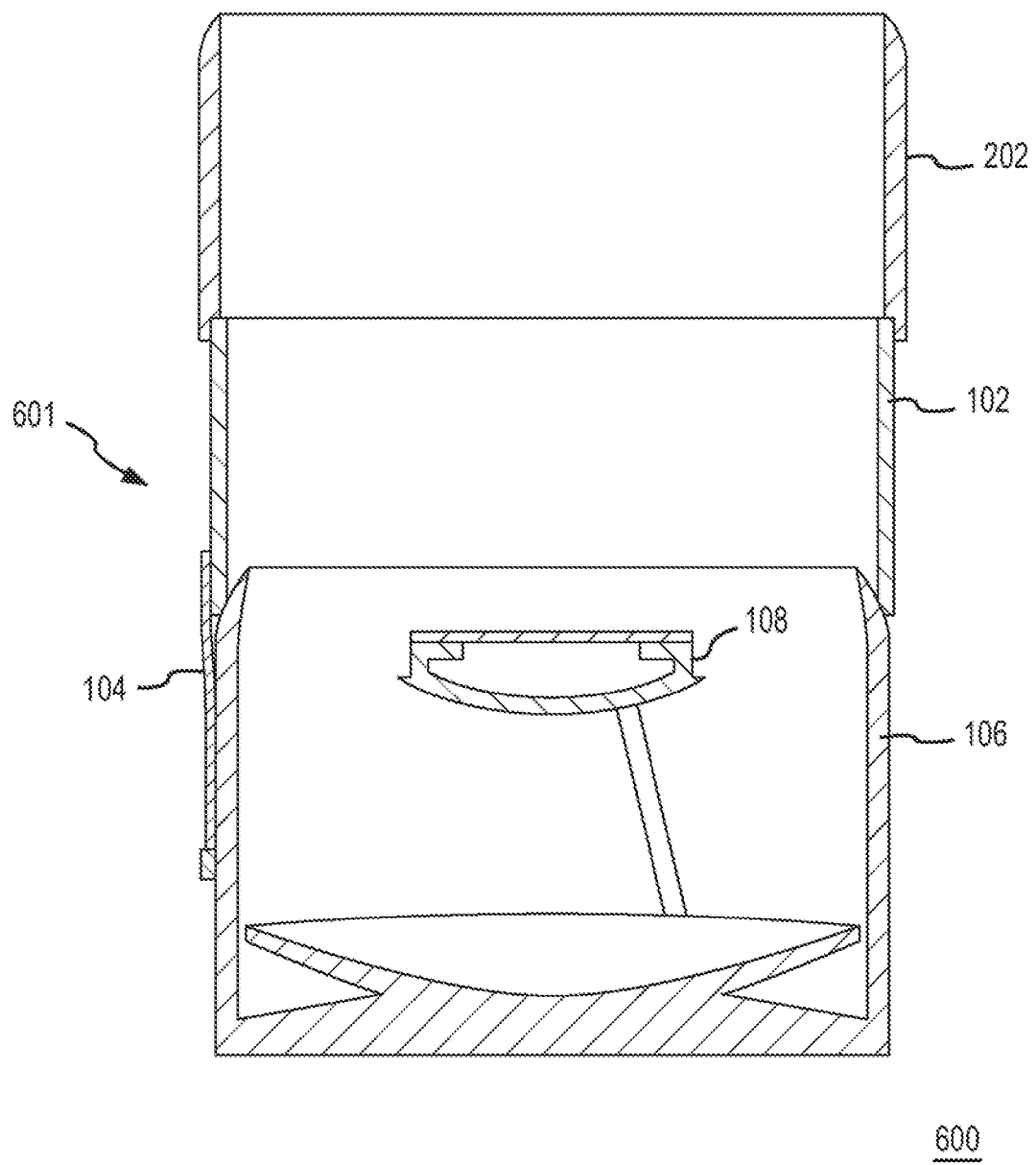
FIG. 6 representatively illustrates an extendable device forming a nesting conic interface in accordance with an exemplary embodiment of the present invention.

FIG. 6 representatively illustrates an extendable device 600 forming a nesting conic interface 601 in accordance with an exemplary and representative embodiment of the present invention. Extendable device 600 is generally depicted in the deployed position. Nesting conic interface 601 is generally intended to describe the relative positions of multiple collars 102/202 characterized by substantial engagement with respect to operation of their interfaces. For example, multiple collars may be configured to provide radiation occlusion and/or aero-thermal protection when deployed. Additionally, multiple collars may be configured to telescope with respect to each other in their stowed and/or deployed configurations, and/or the like.

In an exemplary and representative embodiment, collars 102/202 may interlock; where the term "interlocking" (including any contextual variant thereof) is generally intended to describe the relationship between multiple subsystems that are suitably configured for operation in close proximity to one another. For example, collars 102/202 may be configured to provide substantially continuous radiation occlusion and/or aero-thermal protection when deployed. In a further example, collars 102/202 may be configured to telescope with respect to each other in their stowed and/or deployed positions.

As generally illustrated in FIG. 6, a representative embodiment of the present invention is provided as a cross-sectional view of collar 102 coupled to flexure 104. Flexure 104 is further coupled to housing 106, which is further coupled to an optical device 108. This representative embodiment further comprises a second collar 202 coupled to a second flexure 204 (not shown), wherein the second flexure 204 is further coupled to collar 102.

Collars 102/202 may be suitably configured in a variety of way in accordance with representative and exemplary embodiments of the present invention, in terms of their operation when deployed. For example, first collar 102 may be suitably configured to include tab 312 and second collar 202 may be suitably configured to include groove 314, wherein groove 314 may be suitably configured for operation (to engage with and interlock) with tab 312 upon deployment of collars 102/202.

As a further example, second collar 202 may be suitably configured to include a second tab 312 and first collar 102 may be suitably configured to include a second groove 314, wherein second groove 314 may be suitably configured for operation with second tab 312 upon deployment of collars 102/202. Additionally, first collar 102 may be suitably configured to include a tab 312, second collar 202 may be suitably configured to include a tab 112, and the housing may be suitably configured to include more than one groove 314 suitably configured for operation with each tab 312. In another representative embodiment in accordance with the present invention, first collar 102 may he suitably configured to include a groove 314, second collar 202 may be suitably configured to include a groove 314, and the housing may be suitably configured to include more than one tab 312 suitably configured for operation with groove 314.

Collars 102/202 may be suitably configured in a variety of ways in accordance with representative and exemplary embodiments of the present invention, in terms of their operation when stowed. For example, first collar 102 may be suitably configured to include a tab 312 and second collar 202 may be suitably configured to include a groove 314, wherein the groove may be suitably configured to lock the tab 312 when the collars 102/202 are deployed. As a further example, second collar 202 may be suitably configured to include a tab 312 and first collar 102 may be suitably configured to include a groove 314, wherein groove 314 may be suitably configured to lock tab 312 when collars 102/202 are deployed.

Flexures 104/204 may be suitably configured in a variety of ways in accordance with representative and exemplary embodiments of the present invention, in terms of their operation when stowed. For example, first flexure 104 may be suitably configured to include tab 312 and second flex re 204 may be suitably configured to include groove 314, wherein the groove may be suitably configured to lock tab 312 when flexures 104/204 are deployed. As a further example, second flexure 204 may be suitably configured to include tab 312 and first flexure 104 may be suitably configured to include groove 314, wherein groove 314 may be suitably configured to lock tab 312 when flexures 104/204 are deployed.

FIG. 7 representatively illustrates a proto-collar 700 in accordance with an exemplary and representative embodiment of the present invention. The term "proto" is generally intended to describe a configuration of material where the intended configuration of the material is nascent; such as, for example, a substantially flat piece of material prior to being formed into to collar, an uncoupled flexure prior to being formed and/or coupled to a collar, a discrete element of a piece or part of material prior to being formed into a tab, and/or combinations thereof, and the like. The term "forming" (as it relates to fabrication of proto-collar 700) is generally intended to describe modifying the shaped and/or geometry of a material such that the post-modified state of the material substantially retains a useful shape distinct from the pre-modified starting material.

As generally illustrated in FIG. 7, proto-collar 700 may be coupled to proto-flex tire 704, proto-tab 712 and flexure coupling 716. In the exemplary embodiment representatively depicted, various elements 700/704/712/716 comprise distinct regions of a substantially unitary piece 702. Additional flexure coupling 716 may be used to couple a second flexure, second collar, and the like to collar 102. This substantially unitary piece 702 may be formed by various conventional methods including cutting, casting, computer controlled machining, fused deposition modeling, selective laser sintering, stamping, stereolithography, and/or combinations thereof, and the like. As a further example, substantially unitary piece 702 may comprise various otherwise substantially separate pieces or parts coupled together.

Proto-collar 700, proto-flexure 704, proto-tab 712, and/or flexure coupling 716 may be suitably configured to comprise various materials in various representative and exemplary embodiments, including for example: an alloy comprised of aluminum; an alloy comprised of cadmium; an alloy comprised of cobalt; an alloy comprised of copper; an alloy comprised, of gallium; an alloy comprised of gold; an alloy comprised of indium; an alloy comprised of iron; an alloy comprised of manganese; an alloy comprised of nickel; an alloy comprised of platinum; an alloy comprised of silicon; an alloy comprised of silver; an alloy comprised of tin; an alloy comprised of titanium; an alloy comprised of zinc; aluminum; cadmium; carbon; cellulose; ceramic; cobalt; composite; copper; gallium; gold: indium; iron; manganese; nickel; platinum; polymer; silicon; silver; tin; titanium; zinc; and/or combinations thereof, and the like. Additionally, proto-collar 700, proto-flexure 704, proto-tab 712, and/or flexure coupling 716 may be suitably configured to comprise substantially similar or dissimilar materials.

Proto-collar 700 may be formed into a collar 102 by various methods including, for example: deforming a substantially flat proto-collar 700 and coupling the ends of the deformed proto-collar 700 so as to substantially preserve the deformed shape; deforming more than one substantially flat proto-collar 700 and coupling the ends of the more than one deformed proto-collar 700 so as to substantially preserve the deformed shape; plastically deforming a substantially flat proto-collar 700 so as to preserve the deformed shape; plastically deforming more than one substantially flat proto-collar 700 so as to preserve the deformed shape; and/or combinations thereof, and the like.

Proto-flexure 704 may be formed into flexure 104 by various methods, including for example: suitably configuring proto-flexure 704 to couple to housing 106; deforming proto-flexure 704 to couple to housing 106; suitably configuring proto-flexure 704 to demonstrate elastic properties (e.g., as by heat treatment), and/or the like.

Proto-tab 712 may be formed into tab 312 by various methods, including for example: deforming a substantially flat proto-tab 712 to provide a substantially curved surface for operation with groove 314 and coupling the proto-tab to preserve the deformed shape; plastically deforming a substantially flat proto-tab 712 to provide a substantially curved surface for operation with groove 314 to preserve the deformed shape; and/or the like.

Proto-collar 700, proto-flexure 704, proto-tab 712, and/or flexure coupling 716 may be suitably configured to comprise various shapes and/or geometries in various representative embodiments, including for example: conic and/or conic section (for example: a circle, a cone, a cylinder, a hyperbola, a parabola, a sphere, and/or the like); cylindrical; decagonal; nonagonal; octagonal; heptagonal; hexagonal; pentagonal; rectangular; rhomboidal; triangular; spherical; and/or combinations thereof, and the like. For example, proto-collar 700, proto-flexure 704, proto-tab 712, and/or flexure coupling 716 may be suitably configured to comprise substantially similar or dissimilar geometries.

Proto-collar 700 proto-flexure 704, proto-tab 712, and/or flexure coupling 716 may be suitably configured to comprise a variety of dimensions in various representative and exemplary embodiments. For example, proto-collar 700, proto-flexure 704, proto-tab 712, and/or flexure coupling 716 may be suitably configured to comprise a substantially similar or dissimilar thickness, in accordance with considerations such as local stress conditions and material selections.

Proto-flexure 704 may be suitably configured in a variety of ways in accordance with representative embodiments of the present: invention, in terms of its relationship with proto-collar 700. For example, if proto-collar 700 is suitably configured to deploy substantially longitudinally when formed into a collar 102 and suitably coupled to a housing 106, proto-flexure 704 may be suitably configured to couple substantially normal to the lateral edge of proto-collar 700. As a further example, if proto-collar 700 is suitably configured to at least partially rotate when deployed when formed into collar 102 and suitably coupled to housing 106, proto-flexure 704 may be suitably configured to couple substantially angled to the lateral edge of a proto-collar 700. As yet a further example, more than one proto-flexure 704 may be suitably configured to couple to a single proto-collar 700. Alternatively, conjunctively or sequentially, more than one proto-collar 700 may be suitably configured to couple to a single proto-flexure 704. Alternatively, conjunctively or sequentially, more than one proto-flexure 704 may be suitably configured to couple to more than one proto-collar 700.

Proto-tab 712 may be suitably configured in a variety of ways n accordance with representative and exemplary embodiments of the present invention, in terms of its relationship with proto-collar 700. For example, proto-tab 712 and proto-collar 700 may be suitably configured to comprise distinct regions of a substantially unitary article of manufacture 702. As a further example, proto-tab 712 and proto-collar 700 may be suitably configured to comprise more than one piece or part coupled together. As yet a further example, proto-tab 712 may be suitably configured to couple substantially normal with respect to the lateral edge of proto-collar 700. Alternatively, proto-tab 712 may be suitably configured to couple substantially angularly (e.g., non-orthogonally) with respect to the lateral edge of prow-collar 700.

Proto-tab 712 may be suitably configured in a variety of ways in accordance with representative and exemplary embodiments of the present invention, in terms of its relationship with proto-flexure 704. For example, where operation with groove 314 relates to rotation of coupled collar 102, proto-tab 712 may be suitably configured to operate in accordance with rotation imparted on coupled collar 102 by further coupled flexure 104. As a further example, where operation with groove 314 is substantially independent of rotation of coupled. collar 102, proto-tab 712 may be suitably configured to operate irrespective of rotation imparted on coupled collar 102 by further coupled flexure 104.

Flexure coupling 716 may be suitably configured in a variety of ways in accordance with representative and exemplary embodiments of the present invention, in terms of its relationship to proto-collar 700. For example, flexure coupling 716 may be coupled substantially normal with the lateral edge of proto-collar 700. Alternatively, flexure coupling 716 may be coupled substantially angled (e.g., non-orthogonally) with the lateral edge of proto-collar 700.

Flexure coupling 716 may be suitably configured in a variety of ways in accordance with representative and exemplary embodiments of the present invention, in terms of its relationship with proto-flexure 704. For example, flexure coupling 716 may be coupled along a substantially similar or dissimilar surface as that of proto-flexure 704. As a further example, flexure coupling 716 may be coupled substantially parallel to proto-flexure 704. As yet a further example, flexure coupling 716 may be coupled substantially angled (e.g., non-orthogonally) with proto-flexure 704.

Flexure coupling 716 may be suitably configured in a variety of ways with respect to proto-tab 712. For example, flexure coupling 716 may be coupled along a substantially similar or dissimilar surface as that of proto-tab 712. As yet a further example, flexure coupling 716 may he coupled substantially parallel to proto-tab 712. Alternatively, flexure coupling 716 may be coupled substantially angled (e.g., non-orthogonally) with respect to proto-tab 712.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including", or any contextual variant thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. An extendable protective device comprising:
   a collar suitably configured to provide at least one of radiation occlusion and aero-thermal protection for an optical device, the collar being one of cylindrical and conic in shape, the collar having a principal axis coextensive with an axis of the optical device; and
   a plurality of flexures coupled to the collar, the plurality of flexures spaced about a circumference of the collar, wherein said plurality of flexures are configured to translate said collar in a direction parallel to the principal axis from a stowed position to a deployed position.

2. The extendable device according to claim 1, wherein the collar and the plurality of flexures comprise an alloy comprised of nickel and titanium, and wherein at least one of the collar and the plurality of flexures is suitably configured to flex in an elastic region.

3. The extendable device according to claim 1, wherein the optical device is coupled to a housing, and wherein the plurality of flexures are coupled to the housing.

4. The extendable device according to claim 1, wherein the plurality of flexures are suitably configured to compress in response to stowage of the collar.

5. The extendable device according to claim 1, wherein the collar is suitably configured to deploy in response to extension of the plurality of flexures.

6. The extendable device according to claim 3, wherein the collar further comprises a tab suitably configured for operation with a groove, wherein the groove is suitably disposed on at least one of the housing and a second collar coupled to a second plurality of flexures.

7. The extendable device according to claim 3, wherein the collar further comprises a groove suitably configured for operation with a tab, wherein the tab is suitably disposed on at least one of the housing and a second collar coupled to a second plurality of flexures.

8. A missile, comprising:
   an optical device;
   a collar suitably configured to provide at least one of radiation occlusion and aero-thermal protection for the optical device, the collar being one of cylindrical and conic in shape, the collar having a principal axis coextensive with an axis of the optical device;
   a plurality of flexures coupled to the collar, wherein said plurality of flexures are configured to translate said collar in a direction parallel to the principal axis from a stowed position to a deployed position; and
   a housing coupled to the plurality of flexures and the optical device.

9. The missile according to claim 8, wherein the collar and the plurality of flexures comprise an alloy comprised of nickel and titanium, and wherein at least one of the collar and the plurality of flexures is suitably configured to flex in an elastic region.

10. The missile according to claim 8, wherein the collar is suitably configured to deploy in response to decoupling of a nose cone from the missile.

11. The missile according to claim 8, wherein the housing further comprises a groove, and wherein the collar further comprises a tab suitably configured for operation with the groove.

12. The missile according to claim 8, wherein the housing further comprises a tab, and wherein the collar further comprises a groove suitably configured for operation with the tab.

13. The missile according to claim 8, wherein said collar comprises a first collar and said missile further comprises a second collar having a second groove, wherein said first collar comprises a second tab suitably configured for operation with the second groove.

14. The missile according to claim 8, wherein said collar comprises a first collar and said missile further comprises a second collar having a second tab, wherein said first collar comprises a second groove suitably configured for operation with the second tab.

* * * * *